United States Patent Office 3,594,376
Patented July 20, 1971

---

3,594,376
PROCESS FOR PREPARING 4-PHENYL-QUINAZOLINE-2(1H)-ONES
Stanley C. Bell, Penn Valley, and Peter H. L. Wei, Springfield, Pa., assignors to American Home Products Corporation, New York, N.Y.
No Drawing. Application Feb. 23, 1968, Ser. No. 729,838, which is a division of application Ser. No. 447,545, Apr. 12, 1965. Divided and this application Sept. 5, 1969, Ser. No. 855,733
Int. Cl. C07d 51/48
U.S. Cl. 260—251                              1 Claim

---

ABSTRACT OF THE DISCLOSURE

The preparation of 4-phenylquinazoline-2(1H)-ones by reacting a 2-amino-diphenylmethyleneiminoacetic acid N-oxide with a phenyl haloformate. The products are known compounds having pharmaceutical and other utilities.

---

This application is a division of our application Ser. No. 729,838, filed Feb. 23, 1968, now abandoned; which in turn is a division of our application Ser. No. 447,545, filed Apr. 12, 1965, now abandoned.

This invention is directed to substituted o-amino-N-oxymethyl benzophenoneimines, to a process for preparing such compounds and to their conversion to quinazolines.

The claimed compounds exhibit varied central nervous system activity including depressant activity, anticonvulsant activity and analgesic activity, as determined by standard experimental procedures with warm-blooded animals. The 4-phenylquinazolines produced by the herein disclosed methods have known utilities. Thus, it is well known in the art that quinazoline derivatives have pharmacological uses; namely, as muscle relaxants noting U.S. Pat. No. 3,215,694 and also as vasodilators (hypotensives), noting U.S. Pat. No. 3,266,990, which is also indicated in French Pat. No. 3207M of Mead Johnson and Company, published Apr. 26, 1965. In addition to the pharmacological uses of quinazolines, German Pat. No. 724,261, dated July 9, 1942, discloses that such compounds are useful when added to emulsions, developers, etc. to stabilize and prevent fogging in photographic work. Additionally, British Pat. No. 943,606, dated Dec. 4, 1963, discloses quinazolines utilized in the field of photoconductive coatings.

The claimed compounds can be represented by the following general formula:

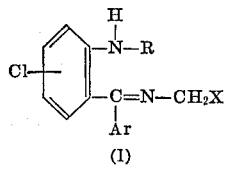

(I)

wherein R is acetyl, X is acetoxy or ethoxy; Ar is phenyl.

For the purpose of this invention, it should be noted that equivalent substituents for the chlorine atom in the above formula include, for example, but without limitation, one or more straight chain or branched alkyl groups having from one to five carbon atoms, and such groups as: nitro, cyano, bromo, haloalkyl, particularly trifluoromethyl. Equivalent substituents for the symbol R include acyloxy groups having up to 5 carbon atoms therein.

Similarly, equivalent substituents for the symbol Ar include, for example, but without limitation, halophenyl, nitrophenyl, alkylphenyl and the like wherein the substituents are on either the o-, m- or p-positions on the phenyl ring. Compounds having the above indicated substituents possess substantially the same properties as the preferred compounds specifically claimed herein.

The compounds of this invention are moderately high melting solids which are substantially insoluble in water and generally soluble in organic solvents such as cyclohexane and ethanol. Examination of these compounds reveals upon nuclear magnetic resonance, ultraviolet and infrared spectrographic analyses spectral data confirming the molecular structure hereinbefore set forth. For example the exocyclic C=N frequency characteristic of the compounds is evident. These characteristics taken together with the nature of the starting materials, the mode of synthesis and the reactions of the claimed compounds positively confirm their structure as being that above set forth.

The reactions occurring in the preparation of compounds by the process of this invention are shown below with reference to specific embodiments of the invention:

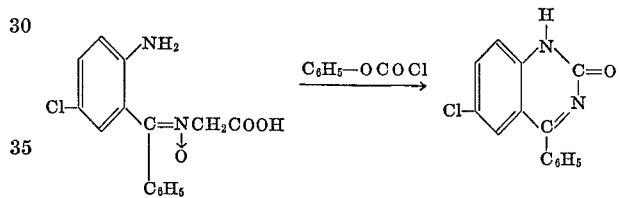

This reaction, resulting in a 4-phenylquinazoline-2(1H)-one, is carried out by adding the chloroformate to a solution of 2-amino-5-chlorodiphenyl methyleneimino acetic acid N-oxide in an inert solvent at room temperature or up to about 100° C., stirring, diluting with water, neutralizing with sodium bicarbonate, extracting with ether and evaporating the ether extracts. This reaction then affords a convenient way of preparing quinazoline-2(1H)-ones.

The details of the claimed invention are illustrated in the following example.

PREPARATION OF 6-CHLORO-4-PHENYL-QUINAZOLINE-2(1H)-ONE

To a solution of 1.0 g. of 2-amino-5-chlorodiphenyl-methyleneiminoacetic acid N-oxide in 15 ml. of dioxane was added 2.0 ml. of phenyl chloroformate with stirring. The resultant solution was diluted with water, neutralized with sodium bicarbonate and extracted with ether. Evaporation of the ether and washing, the residue with alcohol gave 0.7 g. of product, M.P. 300° C.

These compounds may be administered singly with pharmaceutically acceptable carriers or in admixture with other active compounds. The present invention also includes the process of bringing the compounds thereof into a form suitable for therapeutic administration by associating them with liquid or solid, pharmaceutically acceptable carriers.

Various changes and modifications of this invention can be made by those skilled in the art to which it relates and to the extent that such variations incorporate the spirit of the invention, they are included in the scope of the claim.

What is claimed:

1. Process for making 4-phenylquinazoline-2(1H)-one, which process comprises reacting phenylhaloformate with 2-amino-diphenylmethyleneimino-acetic acid N-oxide in an inert solvent at a temperature in the range of from room temperature up to about 100° C. and recovering the product so formed.

References Cited

UNITED STATES PATENTS 3,169,129   2/1965   Rodgers et al. -------- 260—251

ALEX MAZEL, Primary Examiner

R. V. RUSH, Assistant Examiner

U.S. Cl. X.R.

260—999